(12) United States Patent
Saad et al.

(10) Patent No.: US 11,811,651 B2
(45) Date of Patent: Nov. 7, 2023

(54) APPARATUS, SYSTEM, AND METHOD FOR STEERING TRAFFIC OVER NETWORK SLICES

(71) Applicant: Juniper Networks, Inc., Sunnyvale, CA (US)

(72) Inventors: Tarek Saad, Sunnyvale, CA (US); Raveendra Torvi, Sunnyvale, CA (US); Vishnu Pavan Beeram, Sunnyvale, CA (US); Jonathan C. Barth, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 213 days.

(21) Appl. No.: 17/150,082

(22) Filed: Jan. 15, 2021

(65) Prior Publication Data

US 2022/0086082 A1   Mar. 17, 2022

Related U.S. Application Data

(60) Provisional application No. 63/077,270, filed on Sep. 11, 2020.

(51) Int. Cl.
*H04L 45/302* (2022.01)
*H04L 45/44* (2022.01)
*H04L 45/50* (2022.01)
*H04L 45/58* (2022.01)

(52) U.S. Cl.
CPC ............ *H04L 45/302* (2013.01); *H04L 45/44* (2013.01); *H04L 45/50* (2013.01); *H04L 45/583* (2013.01)

(58) Field of Classification Search
CPC ....... H04L 45/302; H04L 45/44; H04L 45/50; H04L 45/583; H04L 45/54
See application file for complete search history.

(56) References Cited

U.S. PATENT DOCUMENTS

| | | | |
|---|---|---|---|
| 9,178,810 B1 * | 11/2015 | Singh | H04L 45/50 |
| 2002/0143849 A1 * | 10/2002 | Newell | H04L 9/40 |
| | | | 709/200 |
| 2006/0274716 A1 * | 12/2006 | Oswal | H04W 40/00 |
| | | | 370/352 |
| 2010/0208721 A1 * | 8/2010 | Miyazaki | H04L 45/04 |
| | | | 370/351 |
| 2013/0022041 A1 * | 1/2013 | Kini | H04L 12/66 |
| | | | 370/389 |

(Continued)

FOREIGN PATENT DOCUMENTS

| | | | | |
|---|---|---|---|---|
| EP | 3832957 A1 * | 6/2021 | ......... | H04L 12/4645 |
| EP | 3968582 A1 * | 3/2022 | ........... | H04L 45/302 |

*Primary Examiner* — Ian N Moore
*Assistant Examiner* — Latresa A McCallum
(74) *Attorney, Agent, or Firm* — Greenberg Traurig, LLP

(57) ABSTRACT

A disclosed method may include (1) receiving, at a network node within a network, a packet from another network node within the network, (2) identifying, within the packet, a slice label that indicates a network slice that has been logically partitioned on the network, (3) determining a QoS policy that corresponds to the network slice indicated by the slice label, (4) applying the QoS policy to the packet, and then upon applying the QoS policy to the packet, (5) forwarding the packet to an additional network node within the network. Various other apparatuses, systems, and methods are also disclosed.

13 Claims, 10 Drawing Sheets

(56) References Cited

U.S. PATENT DOCUMENTS

| | | | |
|---|---|---|---|
| 2013/0223221 A1* | 8/2013 | Xu | H04L 43/0876 370/235 |
| 2015/0310373 A1* | 10/2015 | Kumar | G06Q 10/06395 705/7.41 |
| 2017/0063600 A1* | 3/2017 | Singh | H04L 12/18 |
| 2017/0093611 A1* | 3/2017 | Arora | H04L 45/22 |
| 2017/0164286 A1* | 6/2017 | Jeong | H04W 52/0258 |
| 2018/0026880 A1* | 1/2018 | Nainar | H04L 45/50 370/389 |
| 2018/0091424 A1* | 3/2018 | Jalil | H04L 45/30 |
| 2018/0287891 A1* | 10/2018 | Shaw | H04W 24/02 |
| 2020/0127913 A1* | 4/2020 | Filsfils | H04L 45/04 |
| 2022/0052945 A1* | 2/2022 | Peng | H04W 40/02 |

* cited by examiner

| Incoming Transport Label | Outgoing Transport Label | Prefix | Next Hop |
|---|---|---|---|
| 1 | 20 | 10.200.202.0/24 | 10.200.200 |
| 2 | 12 | 10.200.203.0/24 | 10.200.200 |
| 4 | 15 | 10.200.201.0/24 | 10.200.206 |
| ... | ... | ... | ... |

Lookup Table 600

*FIG. 6*

APPARATUS, SYSTEM, AND METHOD FOR STEERING TRAFFIC OVER NETWORK SLICES

CROSS-REFERENCE TO RELATED APPLICATION

This application claims the benefit of priority under 35 U.S.C. § 119(e) of U.S. Provisional Application No. 63/077,270, filed Sep. 11, 2020, the contents of which are incorporated herein by reference in their entirety.

BACKGROUND

Physical networks may be partitioned into multiple slices that represent and/or constitute isolated logical networks of varying sizes and/or structures. In some examples, each network slice may be dedicated to a specific type of service. Additionally or alternatively, network slices may operate in parallel with some degree of isolation (via, e.g., soft slicing or hard slicing) while providing slice elasticity in terms of capacity.

When logical network slices are applied on top of the physical network, traffic belonging to a specific network slice may be steered to the resources allocated for that slice. For example, flows associated with a specific network slice may be classified on traversed hops and/or along their paths across the network (using, e.g., using hardware filters). In this example, the associated Quality of Service (QoS) profile may be applied to that traffic in order to provide any corresponding Service Level Agreement (SLA) guarantees.

Unfortunately, conventional network slicing technologies may suffer from certain deficiencies and/or shortcomings that potentially limit their ability to steer traffic over network slices in scaled networks. The instant disclosure, therefore, identifies and addresses a need for additional apparatuses, systems, and methods for steering traffic over network slices.

SUMMARY

As will be described in greater detail below, the instant disclosure generally relates to apparatuses, systems, and methods for steering traffic over network slices. In one example, a method for accomplishing such a task may include (1) receiving, at a network node within a network, a packet from another network node within the network, (2) identifying, within the packet, a slice label that indicates a network slice that has been logically partitioned on the network, (3) determining a QoS policy that corresponds to the network slice indicated by the slice label, (4) applying the QoS policy to the packet, and then upon applying the QoS policy to the packet, (5) forwarding the packet to an additional network node within the network.

Similarly, a system that implements the above-identified method may include a physical processor configured to execute various modules stored in memory on a network node within a network. In one example, this system may include and/or execute (1) a receiving module that receives a packet from another network node within the network, (2) an identification module that identifies, within the packet, a slice label that indicates a network slice that has been logically partitioned on the network, (3) a determination module that determines a QoS policy that corresponds to the network slice indicated by the slice label, (4) a QoS module, stored in memory on the network node, that applies the QoS policy to the packet, and (5) a forwarding module forwards the packet to an additional network node within the network after the QoS policy has been applied to the packet.

Additionally or alternatively, an apparatus that implements the above-identified method may include at least one storage device that stores a set of QoS polices that correspond to a set of network slices that have been logically partitioned on the network. The apparatus may also include at least one physical processor communicatively coupled to the storage device. In one example, the physical processor (1) receives a packet from another network node within the network, (2) identifies a slice label that indicates a network slice that has been logically partitioned on the network, (3) determines a QoS policy that corresponds to the network slice indicated by the slice label, (4) applies the QoS policy to the packet, and then (5) forwards the packet to an additional network node within the network upon applying the QoS policy to the packet.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary lookup table that facilitates steering traffic over network slices.

Figure 1:
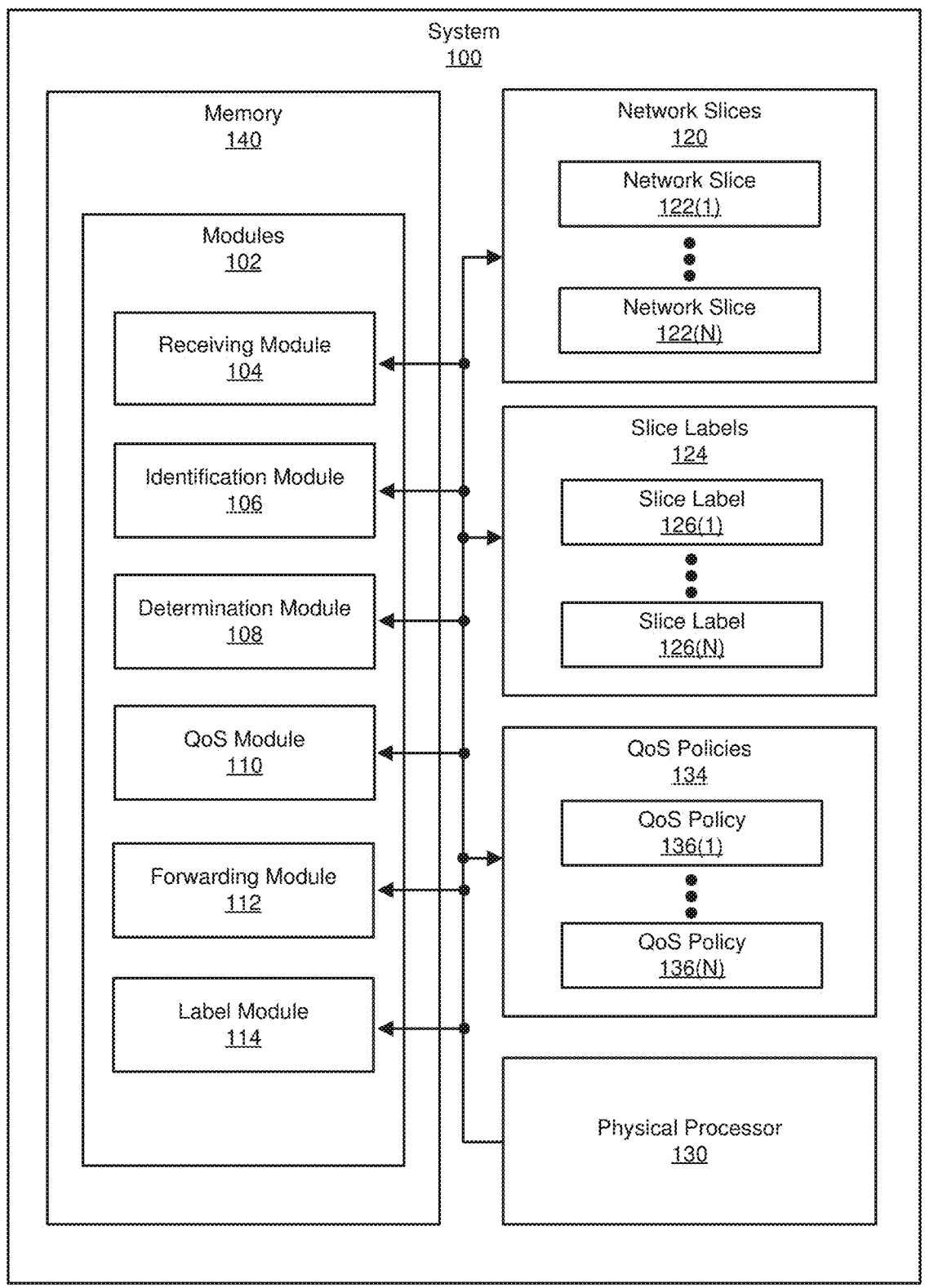
FIG. 1 is a block diagram of an exemplary system for steering traffic over network slices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for steering traffic over network slices. As will be explained in greater detail below, embodiments of the instant disclosure may implement and/or use slice labels on top of Multiprotocol Label Switching (MPLS) label stacks included in packets traversing a network. These slice labels may enable certain network nodes included in the network to steer traffic over specific network slices. In some examples, transit Label Switch Router (LSR) nodes may use classifiers and/or filters to map the identified slice flows. In such examples, the transit LSR nodes may apply a QoS profile associated with the corresponding slice on the interfaces allocated to and/or for that logical slice. For example, a transit LSR node may classify incoming flows as corresponding to a particular network slice based on the top slice label within MPLS label stack. In this example, the transit LSR node may apply the appropriate QoS profile associated with the slice for the specific interface(s) of the transit LSR node.

In some examples, the slice label and any associated QoS may be manually configured and/or programmed on all nodes and/or interfaces incorporated into and/or deployed as part of a specific slice in the network. Additionally or alternatively, information identifying the slice label and/or the associated QoS may be signaled and/or distributed using a controller or by extending Interior Gateway Protocols (IGPs) to flood such information within the corresponding IGP domains.

In some examples, the slice label may be continuously maintained at the top of and/or above the MPLS label stack. In such examples, to determine the forwarding path of a packet, a transit LSR node may perform a lookup operation on the MPLS label (e.g., the transport label) below the slice label in the MPLS label stack. Upon performing the forwarding lookup operation and/or the subsequent label operation, the transit LSR node may forward the packet such that it egresses on a specific network slice. Additionally or alternatively, the transit LSR node and/or another network node may reimpose and/or reapply the slice label to the top of the MPLS label stack.

In some examples, embodiments of the instant disclosure may facilitate identifying flows that are steered onto a specific network slice by imposing a single slice label and/or slice indicator in the MPLS label stack. Additionally or alternatively, embodiments of the instant disclosure may necessitate a single slice label and/or indicator carried by flows belonging to a specific network slice. Embodiments of the instant disclosure may also facilitate scaling network slices to a much higher number (e.g., beyond the traditional limitation of 8 slices). Accordingly, by maintaining the slice label at the top of the label stack, embodiments of the instant disclosure may be able to overcome the impediments and/or limitations of the traditional Readable Label Depth (RLD) when classifying incoming network traffic.

In some examples, embodiments of the instant disclosure may facilitate and/or implement slice identification independent of the underlying transport path. As a result, Resource Reservation Protocol (RSVP) transport paths, Segment Routing (SR) transport paths, and Label Distribution Protocol (LDP) transport paths may be equally applicable. Embodiments of the instant disclosure may be extended to SR version 6 (SRv6) network technologies and/or Path Computation Element (PCE) servers that manage path reservations from a centralized approach. Additionally or alternatively, embodiments of the instant disclosure may co-exist and/or be compatible with RSVP Traffic Engineering (RSVP-TE) Label-Switched Paths (LSPs) and/or bandwidth reservations in the same network.

In some examples, embodiments of the instant disclosure may be deployed as SR techniques for MPLS, Internet Protocol version 6 (IPv6), and/or SRv6 data plane technologies. In one example, a new SRv6 slice segment identifier (analogous to an MPLS slice label) may be carried in an SRv6 header to identify the flow belonging to a specific network slice. In this example, a transit IPv6 router may need to process multiple (e.g., two) SRv6 segment identifiers (e.g., slice segment identifiers and/or forwarding segment identifiers) within a packet before forwarding the packet downstream. Additionally or alternatively, IPv6 segments (identified, e.g., by the left-most field inside the segment routing header) may be manipulated such that each transit LSR node is able to process multiple (e.g., two) SRv6 segment identifiers.

The following will provide, with reference to FIGS. 1-8 detailed descriptions of exemplary apparatuses, systems, components, and corresponding implementations for steering traffic over network slices. Detailed descriptions of computer-implemented methods for steering traffic over network slices will be provided in connection with FIG. 9. In addition, detailed descriptions of an exemplary computing system for carrying out these methods will be provided in connection with FIG. 10.

FIG. 1 shows an exemplary system 100 that facilitates steering traffic over network slices. As illustrated in FIG. 1, system 100 may include one or more modules 102 for performing one or more tasks. As will be explained in greater detail below, modules 102 may include a receiving module 104, an identification module 106, a determination module 108, a QoS module 110, a forwarding module 112, and a label module 114. Although illustrated as separate elements, one or more of modules 102 in FIG. 1 may represent portions of a single module, application, and/or operating system.

In certain embodiments, one or more of modules 102 in FIG. 1 may represent one or more software applications or programs that, when executed by a computing device, cause computing device to perform one or more tasks. For example, and as will be described in greater detail below, one or more of modules 102 may represent modules stored and configured to run on one or more computing devices, such as the devices illustrated in FIG. 2 (e.g., network nodes 202, 206, 208, 210(1)-(N), and/or 212(1)-(N)), the devices illustrated in FIG. 3 (e.g., ingress LER 302, egress LER 310, and/or transit LSRs 304, 306, and/or 308), and/or the devices illustrated in FIG. 10 (e.g., computing system 1000). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102, Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate steering traffic over network slices. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more network slices, such as network slices 120. In some examples, network slices 120 may each constitute and/or represent any type or form of logical partition and/or virtual division of a network. In one example, network slices 120 may include and/or represent network slices 122(1)-(N) that have each been logically partitioned on a network. In this example, network slices 122(1)-(N) may each include and/or represent a different and/or distinct set of resources, services, features, and/or provisions relative to one another. Accordingly, network slice 122(1) may include and/or represent one set of resources, services, features, and/or provisions within the network, and network slice 122(N) may include and/or represent another set of resources, services, features, and/or provisions within the network.

As illustrated in FIG. 1, exemplary system 100 may additionally include one or more slice labels, such as slice labels 124. In some examples, slice labels 124 may each identify and/or represent any type or form of network slice that has been logically partitioned on a network. In one example, slice labels 124 may include and/or represent slice labels 126(1)-(N) that each correspond to and/or identify one of network slices 120. In this example, slices labels 124 may have a one-to-one relationship with and/or designation to network slices 120. For example, slice label 126(1) may correspond to and/or identify network slice 122(1), and slice label 126(N) may correspond to and/or identify network slice 122(N).

As illustrated in FIG. 1, exemplary system 100 may even include one or more QoS policies, such as QoS policies 134. In some examples, QoS policies 134 may each identify and/or represent any type or form of technology that guarantees, monitors, and/or measures one or more performance parameters and/or metrics of a service or network. In one example, QoS policies 134 may include and/or represent QoS policies 136(1)-(N) that each correspond to and/or are reserved for one of network slices 120. In this example, QoS policies 134 may have a one-to-one or one-to-many relationship with and/or designation to network slices 120. For example, QoS policy 136(1) may correspond and/or apply to network slice 122(1), and QoS policy 136(N) may correspond and/or apply to network slice 122(N).

In some examples, QoS policies 134 may represent and/or be referred to as simply QoSes. QoS policies 134 and/or QoSes in general may include and/or represent measurements directed to and/or associated with various parameters and/or metrics of a service or network. Examples of such parameters and/or metrics include, without limitation, bandwidth, throughput, latency, delay, jitter, variance in latency, error rate, packet loss, bit rate, availability, variations or combinations of one or more of the same, and/or any other suitable parameters and/or metrics.

In some examples, QoSes may include and/or represent a description and/or measurement of the overall performance of a service, especially one whose performance is particularly important to the experience of a user and/or is easily perceived or noticed by the user. Examples of such a service include, without limitation, media streaming services, video streaming services, audio streaming services, telephony services, video conferencing services, video-on-demand services, computer networks, cloud computing services, circuit emulation services, online gaming services, industrial control services, online television services, variations or combinations of one or more of the same, and/or any other suitable services.

Figure 2:
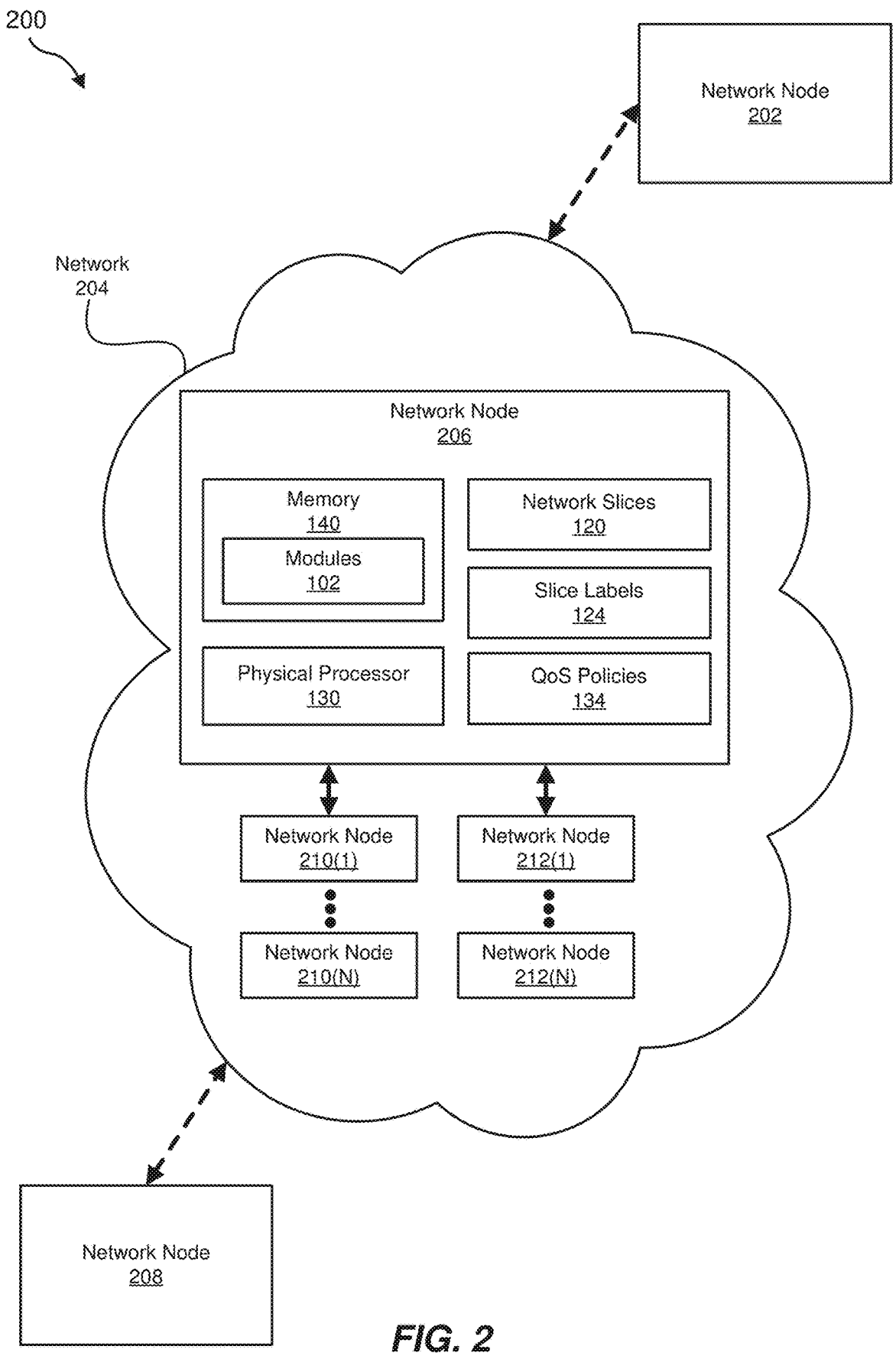
FIG. 2 is a block diagram of an additional exemplary system for steering traffic over network slices.

An apparatus for steering traffic over network slices may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among network node 206, network nodes 210(1)-(N), network nodes 212(1)-(N), network node 202, and/or network node 208.

As illustrated in FIG. 2, network 204 may include and/or represent various network devices and/or nodes that form and/or establish communication paths and/or segments. For example, network 204 may include a network node 206 that forwards traffic from network node 202 along one or more active paths toward network node 208. In this example, an active path may include and/or represent network nodes 210(1)-(N), and another active path may include and/or represent network nodes 212(1)-(N).

In some embodiments, each of network nodes 202, 206, 208, 210(1)-(N), and/or 212(1)-(N) may include and/or represent an instance of memory 140 and/or an instance of physical processor 130. Additionally or alternatively, each of network nodes 202, 206, 208, 210(1)-(N), and/or 212(1)-(N) may include, access, and/or apply one or more of slice labels 124 and/or QoS policies 134. Each of network nodes 202, 206, 208, 210(1)-(N), and/or 212(1)-(N) may also access and/or represent part of one or more of network slices 120.

In some examples, and as will be described in greater detail below, one or more of modules 102 may cause network node 206 to (1) receive a packet from another network node (e.g., network node 202) within network 204, (2) identify, within the packet, slice label 126(1) that indicates and/or identifies network slice 122(1) that has been logically partitioned on network 204, (3) determine that QoS policy 134(1) corresponds to network slice 122(1) as indicated by slice label 126(1), (4) applying QoS policy 134(1) to the packet, and then upon applying the QoS policy to the packet, (5) forwarding the packet to an additional network node within the network.

Network nodes 202, 206, 208, 210(1)-(N), and/or 212(1)-(N) each generally represent any type or form of physical computing device capable of reading computer-executable instructions and/or handling network traffic. In one example, network nodes 202, 206, 208, 210(1)-(N), and/or 212(1)-(N) may each include and/or represent a router (such as a transit label switching router, a label edge router, a provider edge router, a hub router, a spoke router, an autonomous system boundary router, and/or an area border router). Additional examples of network nodes 202, 206, 208, 210(1)-(N), and/or 212(1)-(N) include, without limitation, switches, hubs, modems, bridges, repeaters, gateways (such as Broadband Network Gateways (BNGs)), multiplexers, network adapters, network interfaces, linecards, collectors, client devices, laptops, tablets, desktops, servers, cellular phones, Personal Digital Assistants (PDAs), multimedia players, embedded systems, wearable devices, gaming consoles, portions of one or more of the same, variations or combinations of one or more of the same, and/or any other suitable devices.

Network 204 generally represents any medium and/or architecture capable of facilitating communication and/or data transfer. In one example, network 204 may include any or all of network nodes 202, 206, 208, 210(1)-(N), and/or 212(1)-(N) even though some of these devices are illustrated as being external to network 204 in FIG. 2. Additionally or alternatively, network 204 may include other devices that facilitate communication among network nodes 202, 206, 208, 210(1)-(N), and/or 212(1)-(N). Network 204 may facilitate communication or data transfer using wireless and/or wired connections. Examples of network 204 include, without limitation, an intranet, an access network, a layer 2 network, a layer 3 network, an MPLS network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 9:
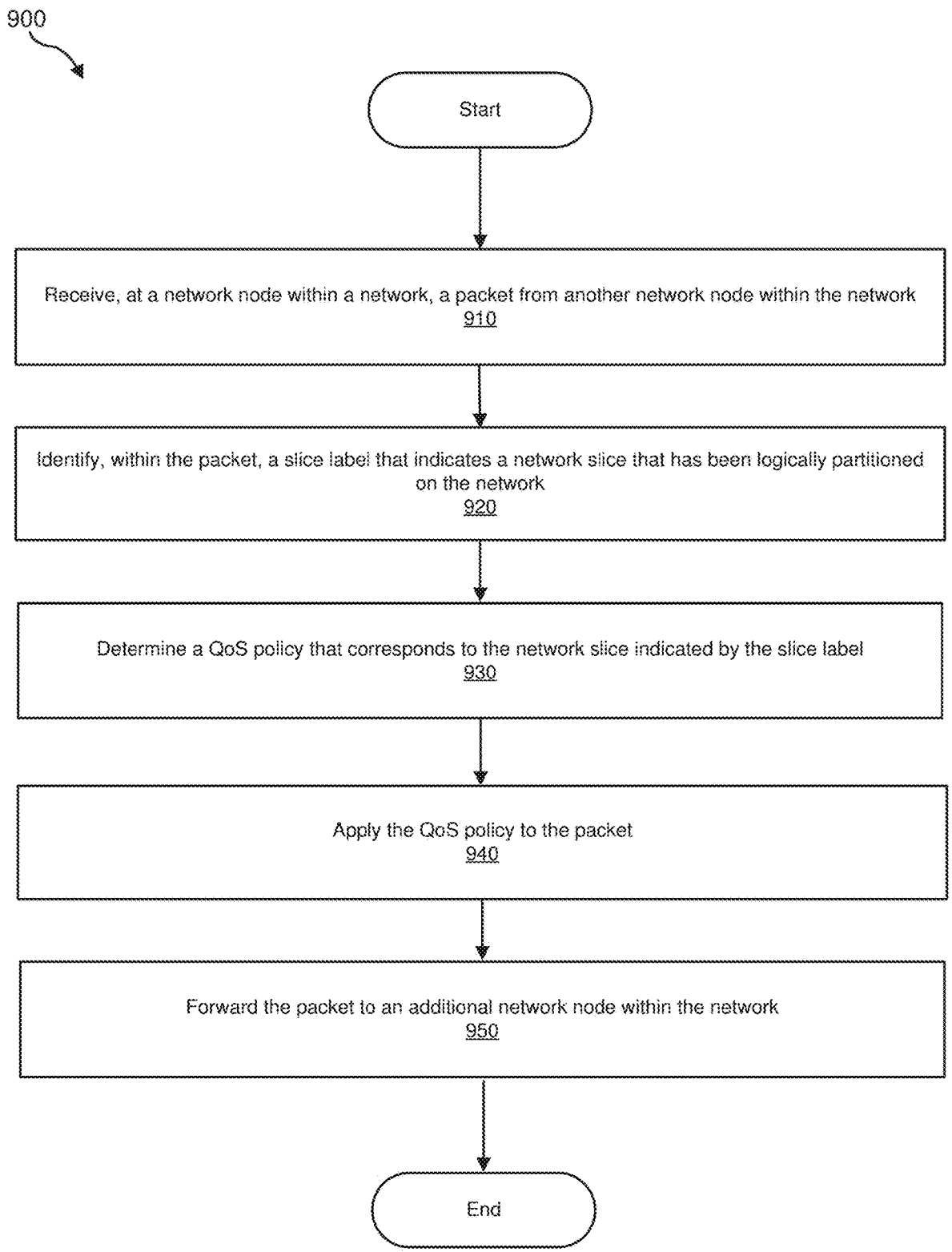
FIG. 9 is a flow diagram of an exemplary method for steering traffic over network slices.

FIG. 9 is a flow diagram of an exemplary computer-implemented method 900 for steering traffic over network slices. The steps shown in FIG. 9 may be performed by any suitable computer-executable code and/or computing system, including system 100 in FIG. 1, system 200 in FIG. 2, system 300 in FIG. 3, system 1000 in FIG. 10, and/or variations or combinations of one or more of the same. In addition, the steps shown in FIG. 9 may be performed by any suitable node, device, and/or component included in system 100 in FIG. 1, system 200 in FIG. 2, system 300 in FIG. 3, system 1000 in FIG. 10, and/or the like. In one example, each of the steps shown in FIG. 9 may represent an algorithm whose structure includes and/or is represented by multiple sub-steps, examples of which will be provided in greater detail below.

As illustrated in FIG. 9, at step 910 one or more of the systems described herein may receive, at a network node within a network, a packet from another network node within the network. For example, receiving module 104 may, as part of network node 206 in FIG. 2, receive a packet from network node 202 within network 204. In one example, the packet may include and/or represent metadata (such as a header) and/or a payload. In this example, the packet may constitute and/or represent part of a certain traffic flow. Such a traffic flow may include and/or represent a sequence of packets that originate from a specific source and are directed toward a specific destination.

The systems described herein may perform step 910 in a variety of ways and/or contexts. In some examples, receiving module 104 may monitor network node 206 for incoming traffic traversing across network 204. In such examples, network node 202 may send, transmit, and/or forward traffic to network node 206 via network 204. While monitoring network node 206 for incoming traffic, receiving module 104 may detect and/or identify a packet traversing from network node 202 to network node 208 via network 204.

Returning to FIG. 9, at step 920 one or more of the systems described herein may identify, within the packet, a slice label that indicates a network slice that has been logically partitioned on the network. For example, identification module 106 may, as part of network node 206 in FIG. 2, identify one of slice labels 124 within the packet. In this example, the slice label may be found and/or identified within the metadata (such as a header) of the packet. In one embodiment, the slice label may include and/or represent the 10 most significant bits of a flow label within the header, and a flow identifier may include and/or represent the 10 least significant bits of the flow label within the header.

In some examples, the slice label may indicate and/or identify one of network slices 120 that have been logically partitioned on network 204. In one example, the network slice may be dedicated to a specific type of service. Additionally or alternatively, the network slice may provide and/or make available one or more resources to the packet due at least in part to the packet belonging to that network slice.

The network slice to which the packet belongs may be allocated for a specific purpose and/or application within network 204. Examples of the network slice include automotive slices, industry automation slices, live broadcasting slices, Internet of Things (IoT) slices, enterprise network slices, low-latency slices, broadband slices, manufacturing slices, utilities slices, combinations or variations of one or more of the same, and/or any other suitable network slices.

The systems described herein may perform step 920 in a variety of ways and/or contexts. In some examples, identification module 106 may search the packet for any slice labels that indicate and/or identify a specific network slice to which the packet belongs and/or corresponds. During this search, identification module 106 may locate and/or find one of slice labels 124 within an MPLS label stack included in the metadata of the packet. For example, identification module 106 may locate and/or find the MPLS label stack of the packet and then search the MPLS label stack for one of slice labels 124. In this example, identification module 106 may identify one of slice labels 124 within the MPLS label stack during this search.

Figure 4:
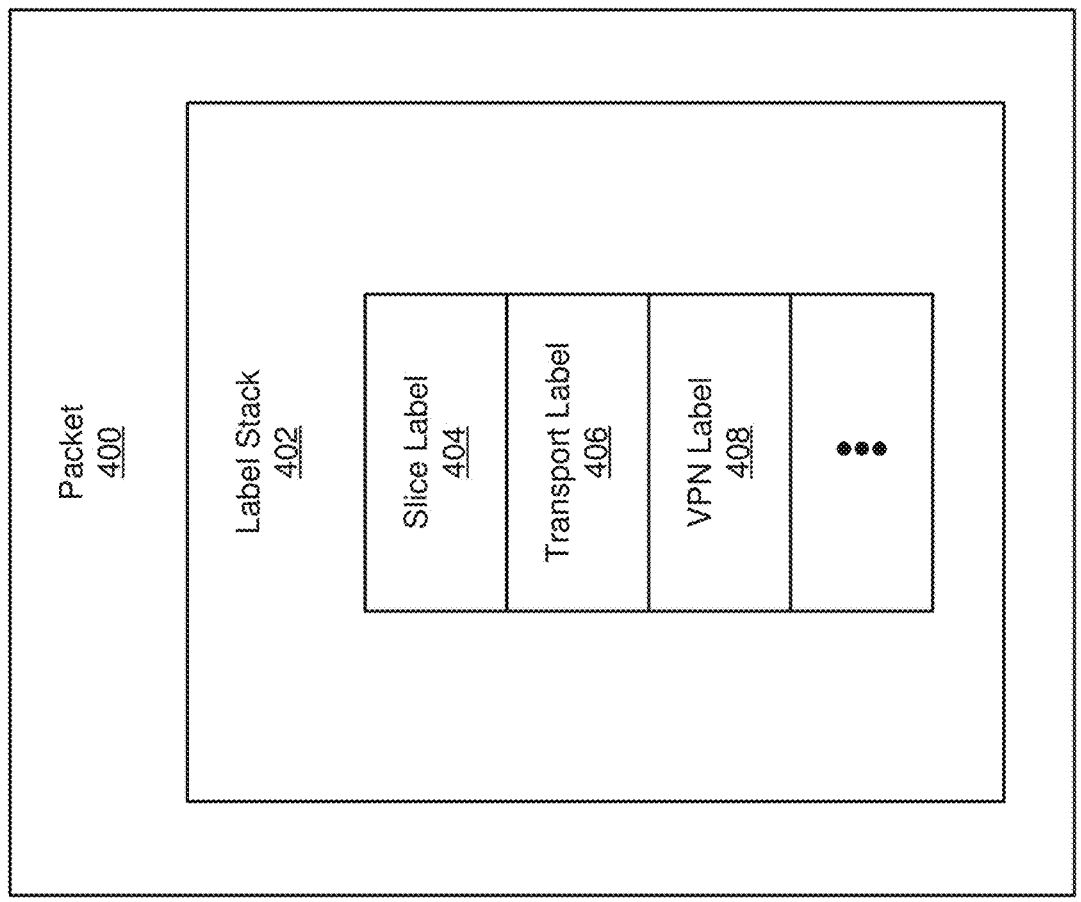
FIG. 4 is a block diagram of an exemplary packet with a label stack that facilitates steering traffic over network slices.

A slice label may be placed and/or located in various positions within the MPLS label stack. In some examples, a slice label may be placed and/or located on top of the MPLS label stack. FIG. 4 illustrates an exemplary packet 400 that includes a slice label 404 imposed and/or positioned on the top of a label stack 402. As illustrated in FIG. 4, label stack 402 of packet 400 may include and/or represent a transport label 406 and/or a Virtual Private Network (VPN) label 408 in addition to slice label 404. In this example, slice label 404 may be placed and/or located in the top-most position within label stack 402.

Examples of transport label 406 include, without limitation, Border Gateway Protocol (BGP) labels, RSVP labels, Label Distribution Protocol (LOP) labels, variations or combinations of one or more of the same, and/or any other suitable transport label. Although not illustrated in this way in FIG. 4, label stack 402 may include and/or represent one or more additional MPLS labels in addition to slice label 404, transport label 406, and VPN label 408.

In one example, identification module 106 may search and/or analyze label stack 402 for a slice label. During this search and/or analysis, identification module 106 may find and/or identify slice label 404 on the top of label stack 402. In this example, label module 114 may, as part of network node 206 in FIG. 2, pop slice label 404 from the top of label stack 402, thereby exposing transport label 406.

Continuing with this example, identification module 106 may identify transport label 406 beneath slice label 404 once slice label 404 has been popped from label stack 402. In this example, label module 114 may replace, within label stack 402, transport label 406 with an additional transport label that indicates and/or identifies an additional network node (e.g., the next hop for packet 400) within network 204. Once transport label 406 has been replaced by the additional transport label, label module 114 may reimpose and/or reapply slice label 404 on the top of label stack 402 such that the additional transport label resides beneath slice label 404 within label stack 402. The resulting packet may then be ready and/or prepared for forwarding to its next hop.

In one example, to replace transport label 406 with the additional transport label, label module 114 may pop transport label 406 from label stack 402. In this example, label module 114 and/or identification module 106 may determine and/or look up the additional transport label that indicates and/or identifies the additional network node in a lookup table based at least in part on transport label 406. Label module 114 may then impose and/or apply the additional transport label on label stack 402.

FIG. 6 illustrates an exemplary lookup table 600 that includes entries identifying, among other things, various incoming and outgoing transport labels. As a specific example, if transport label 406 corresponds to and/or represents the "1" incoming transport label within lookup table 600, then label module 114 and/or identification module 106 may determine that the "20" outgoing transport label should be imposed and/or applied to packet 400 based at least in part on the lookup. This "20" outgoing transport label may enable and/or direct network node 206 to forward packet 400 to the next hop corresponding to the "10.200.200" address.

Similarly, if transport label 406 corresponds to and/or represents the "4" incoming transport label within lookup table 600, then label module 114 and/or identification module 106 may determine that the "15" outgoing transport label should be imposed and/or applied to packet 400 based at least in part on the lookup. This "15" outgoing transport label may enable and/or direct network node 206 to forward packet 400 to the next hop corresponding to the "10.200.206" address.

Figure 5:
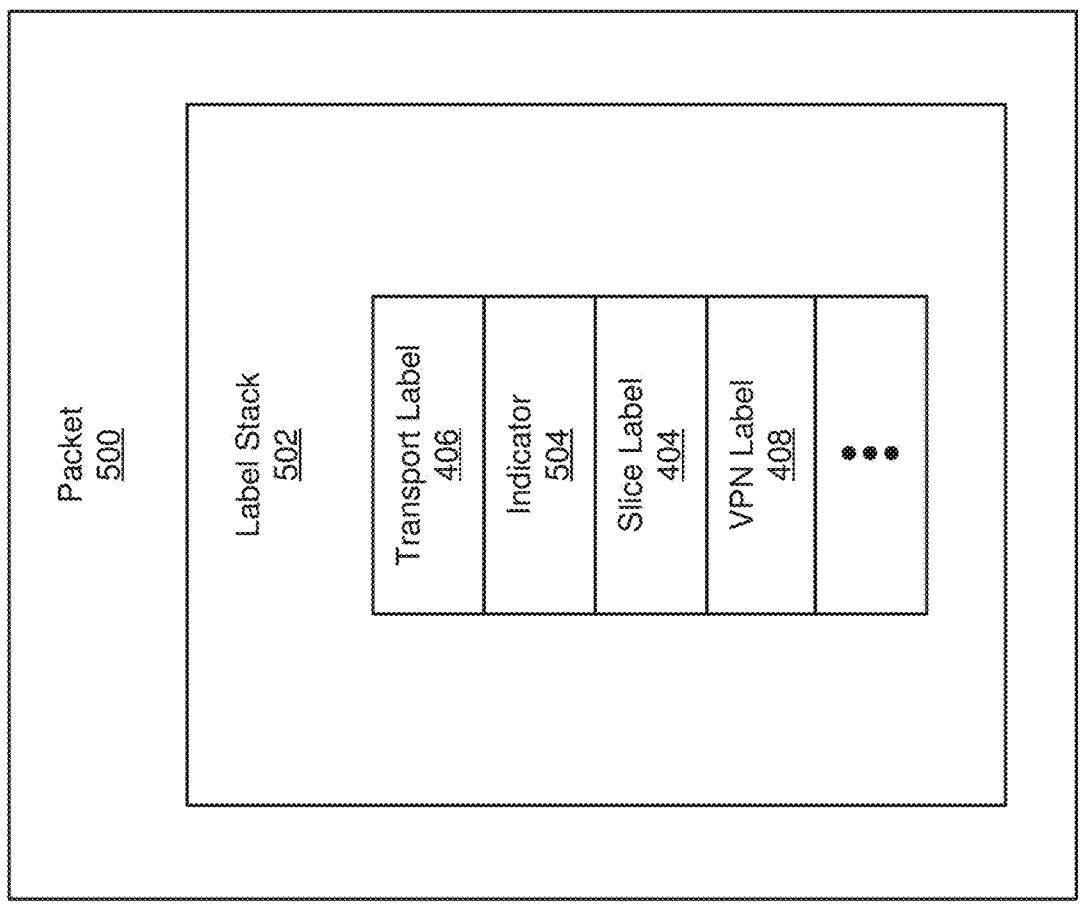
FIG. 5 is a block diagram of an additional exemplary packet with an additional label stack that facilitates steering traffic over network slices.

In other examples, a slice label may be placed and/or located in the middle and/or toward the bottom of the MPLS label stack. FIG. 5 illustrates an exemplary packet 500 that includes slice label 404 imposed and/or positioned in the middle of a label stack 502. As illustrated in FIG. 5, label stack 502 of packet 500 may include and/or represent transport label 406, VPN label 408, and/or an indicator 504 in addition to slice label 404. In this example, indicator 504 may indicate and/or denote the presence of a slice label in the next position within label stack 502. In other words, indicator 504 may be placed and/or positioned directly above slice label 404 within label stack 502. Although not illustrated in this way in FIG. 5, label stack 502 may include and/or represent one or more additional MPLS labels in addition to slice label 404, transport label 406, VPN label 408, and indicator 504.

In one example, identification module 106 may search and/or analyze label stack 502 for a slice label. During this search and/or analysis, identification module 106 may find and/or identify transport label 406 on the top of label stack 502. In this example, label module 114 may pop transport label 406 and indicator 504 from the top of label stack 402, thereby exposing slice label 404.

Continuing with this example, identification module 106 may find and/or identify slice label 404 beneath transport label 406 and indicator 504 once they have been popped from label stack 502. In this example, determination module 108 may, as part of network node 206 in FIG. 2, analyze slice label 404 to facilitate determining which QoS policy corresponds to the network slice to which packet 500 belongs. Label module 114 may then reimpose indicator 504 above slice label 404. In addition, label module 114 may impose an additional transport label that indicates and/or identifies an additional network node (e.g., the next hop for packet 500) within network 204. Accordingly, slice label 404 may reside beneath the additional transport label within label stack 502.

In one example, to replace transport label 406 with the additional transport label, label module 114 may determine and/or look up the additional transport label that indicates and/or identifies the additional network node in lookup table 600 based at least in part on transport label 406. In this example, label module 114 may also maintain slice label 404 beneath the additional transport label and indicator 504. The resulting packet may then be ready and/or prepared for forwarding to its next hop.

Returning to FIG. 6, if transport label 406 corresponds to and/or represents the "2" incoming transport label within lookup table 600, then label module 114 and/or identification module 106 may determine that the "12" outgoing transport label should be imposed and/or applied to packet 500 based at least in part on the lookup. This "12" outgoing transport label may enable and/or direct network node 206 to forward packet 500 to the next hop corresponding to the "10.200.200" address.

Returning to FIG. 9, at step 930 one or more of the systems described herein may determine a QoS policy that corresponds to the network slice indicated by the slice label. For example, determination module 108 may, as part of network node 206 in FIG. 2, determine which of QoS policies 134 corresponds and/or applies to the network slice indicated by the slice label identified within the packet. In this example, the QoS may be configured and/or programmed to facilitate monitoring the performance of the network slice in connection with the packet and/or associated traffic.

The systems described herein may perform step 930 in a variety of ways and/or contexts. In some examples, determination module 108 and/or identification module 106 may search a lookup table for an entry indicating which of QoS policies 134 corresponds and/or applies to the network slice indicated by the slice label identified within the packet. During this search, determination module 108 and/or identification module 106 may locate and/or find information identifying one of QoS policies 134 that corresponds and/or applies to the network slice and thus also corresponds and/or applies to the packet. Determination module 108 may then determine and/or discover the correct QoS policy based at least in part on such information.

In other examples, determination module 108 and/or identification module 106 may query a QoS management tool and/or mechanism for information identifying which of QoS policies 134 corresponds and/or applies to the network slice indicated by the slice label. In response to this query, determination module 108 and/or identification module 106 may receive and/or obtain the information identifying one of QoS policies 134 that corresponds and/or applies to the network slice and thus also corresponds and/or applies to the packet. Determination module 108 may then determine and/or discover the correct QoS policy based at least in part on such information.

Returning to FIG. 9, at step 940 one or more of the systems described herein may apply the QoS policy to the packet. For example, QoS module 110 may, as part of network node 206 in FIG. 2, apply one of QoS policies 134 to the packet. In this example, the QoS may enable network node 206 to monitor the performance of the network slice in connection with the packet and/or its flow.

The systems described herein may perform step 940 in a variety of ways and/or contexts. In some examples, QoS module 110 may execute and/or perform the applicable QoS in connection with the packet and/or its flow to record, collect, and/or compute data, information, or statistics relative to the network slice's performance in connection with the packet and/or its flow. Additionally or alternatively, QoS module 110 may execute and/or perform the applicable QoS to direct the packet to certain resources that are provided by and/or reserved for the network slice.

In some examples, QoS module 110 may execute and/or perform the applicable QoS to control prioritizing, queueing, and/or transmitting the packet and/or its flow in a certain order relative to other packets and/or their flows. For example, the applicable QoS may cause and/or direct network node 206 to order the queues in a specific way for processing, servicing, and/or transmission. The applicable QoS may also cause and/or direct network node 206 to control the latency and/or throughput experienced by the packet and/or its flow.

Returning to FIG. 9, at step 950 one or more of the systems described herein may forward the packet to an additional network node within the network. For example, forwarding module 112 may, as part of network node 206 in FIG. 2, forward the packet to an additional network node (such as one of network nodes 210(1)-(N), 212(1)-(N), and/or 208) once the QoS has been applied to the packet. In one example, the additional network node may include and/or represent an intermediary node along the path leading toward the packet's final destination. Alternatively, the additional network node may include and/or represent the final destination of the packet.

The systems described herein may perform step 950 in a variety of ways and/or contexts. In some examples, forwarding module 112 may send and/or transmit the packet to the additional network node. For example, forwarding module 112 may cause and/or direct network node 206 to send and/or transmit the packet to network node 210(1) on the way to network node 208. In this example, network node 208 may constitute and/or represent the egress node of an LSP of the packet. Additionally or alternatively, network node 208 may constitute and/or represent the final destination of the packet.

Figure 3:
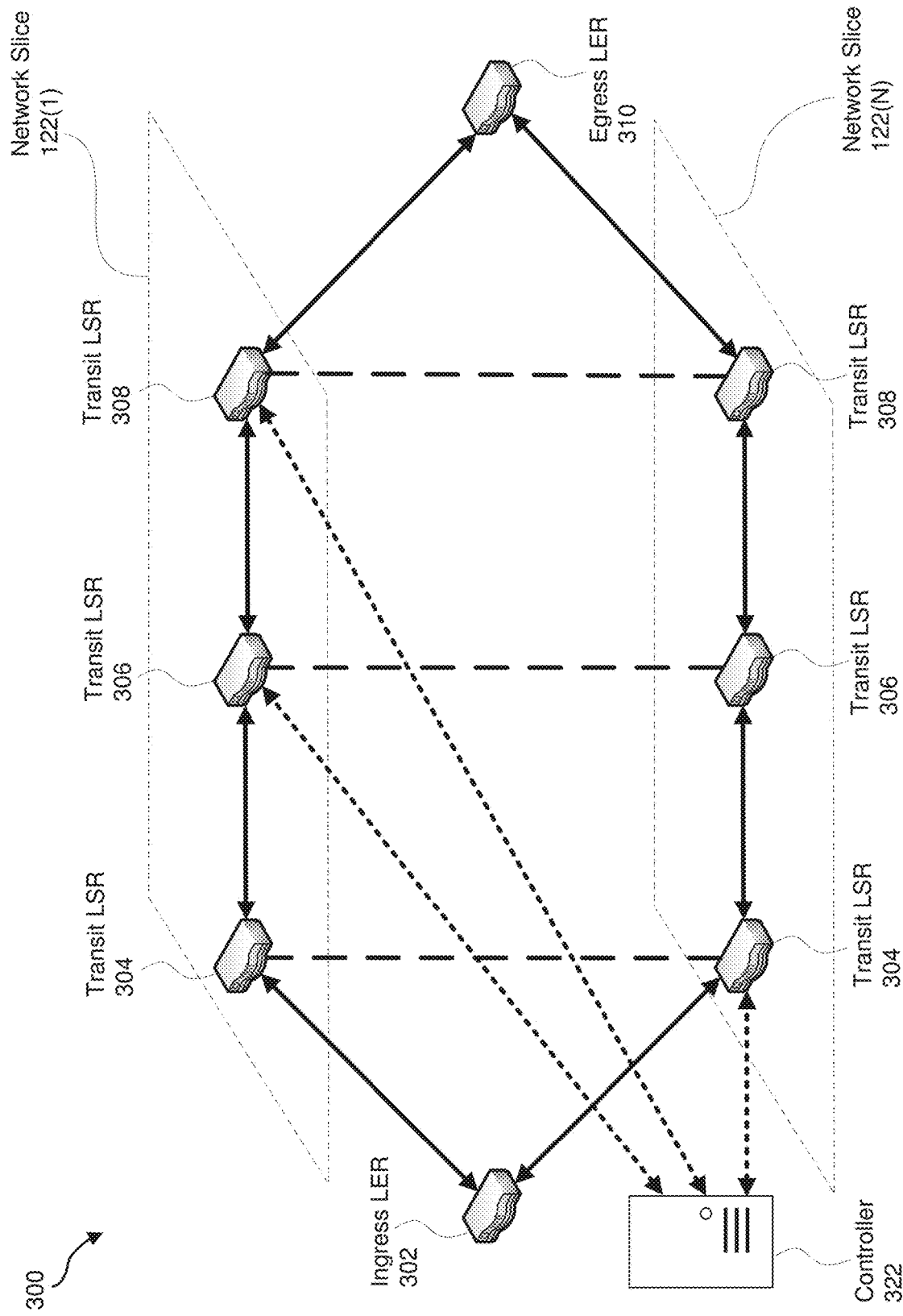
FIG. 3 is a block diagram of an additional exemplary system for steering traffic over network slices.

FIG. 3 illustrates an exemplary system 300 for steering traffic over network slices. As illustrated in FIG. 3, exemplary system 300 may include and/or represent an ingress Label Edge Router (LER) 302, an egress LER 310, and transit LSRs 304, 306, and 308. In one example, a path may form and/or exist between ingress LER 302 and egress LER 310 via transit LSRs 304, 306, and 308. For example, ingress LER 302 may transmit traffic along transit LSRs 304, 306, and 308 to egress LER 310. In other words, ingress LER 302 may forward traffic to transit LSR 304, which in turn forwards the traffic to transit LSR 306, and so on until the traffic ultimately reaches egress LER 310.

In some examples, each of transit LSRs 304, 306, and 308 may have access to network slices 122(1) and 122(N). For example, system 300 may also include and/or represent a controller 322 that programs transit LSRs 304, 306, and 308 to associate one or more of QoS policies 134 with one or more of network slices 120. In this example, controller 322 may send a control signal to one or more of transit LSRs 304, 306, and 308, ingress LER 302, and/or egress LER 310. This control signal may direct and/or instruct any of these routers to program and/or map a specific QoS to a corresponding network slice. In response to this control signal, any of these routers may program a lookup table and/or a slice management tool to associate the specific QoS with the specific network slice.

In some examples, ingress LER 302 may forward a packet destined at least intermediately for egress LER 310 to transit LSR 304. In one example, ingress LER 302 may determine that the packet belongs to one of network slices 120 and/or may select one of network slices 120 for the packet. In this example, ingress LER 302 may steer the packet over that network slice by imposing slice label 404, transport label 406, and VPN label 408 on the packet's label stack. In this example, transport label 406 may direct ingress LER 302 to forward the packet to transit LSR 304.

In some examples, upon receiving the packet from ingress LER 302, transit LSR 304 may pop slice label 404 from the label stack and then determine which of QoS policies 134 corresponds and/or applies to the packet based at least in part on slice label 404. In one example, slice label 404 may indicate and/or communicate to transit LSR 304 that the packet belongs to network slice 122(1) or 122(N). In this example, transit LSR 304 may apply, to the packet, the QoS indicated by slice label 404 and/or corresponding to the network slice. In addition, transit LSR 304 may replace transport label 406 with another transport label corresponding to transit LSR 306 and then reimpose and/or reapply slice label 404 on the packet's label stack. Once slice label 404 has been reimposed on the label stack, transit LSR 304 may forward the packet to transit LSR 306.

Similarly, upon receiving the packet from transit LSR 304, transit LSR 306 may pop slice label 404 from the label stack and then determine which of QoS policies 134 corresponds and/or applies to the packet based at least in part on slice label 404. In one example, slice label 404 may indicate and/or communicate to transit LSR 306 that the packet belongs to network slice 122(1) or 122(N). In this example, transit LSR 306 may apply, to the packet, the QoS indicated by slice label 404 and/or corresponding to the network slice, Transit LSR 306 may replace the current transport label with another transport label corresponding to transit LSR 308 and then reimpose and/or reapply slice label 404 on the packet's label stack. Once slice label 404 has been reimposed on the label stack, transit LSR 306 may forward the packet to transit LSR 308.

Further, upon receiving the packet from transit LSR 306, transit LSR 308 may pop slice label 404 from the label stack and then determine which of QoS policies 134 corresponds and/or applies to the packet based at least in part on slice label 404. In one example, slice label 404 may indicate and/or communicate to transit LSR 308 that the packet belongs to network slice 122(1) or 122(N). In this example, transit LSR 308 may apply, to the packet, the QoS indicated by slice label 404 and/or corresponding to the network slice. Transit LSR 308 may replace the current transport label with another transport label corresponding to egress LER 310 and then reimpose and/or reapply slice label 404 on the packet's label stack. Once slice label 404 has been reimposed on the label stack, transit LSR 308 may forward the packet to egress LER 310.

Finally, upon receiving the packet from transit LSR 308, egress LER 310 may pop slice label 404 from the label stack and then determine which of QoS policies 134 corresponds and/or applies to the packet based at least in part on slice label 404. In one example, slice label 404 may indicate and/or communicate to egress LER 310 that the packet belongs to network slice 122(1) or 122(N). In this example, egress LER 310 may apply, to the packet, the QoS indicated by slice label 404 and/or corresponding to the network slice. Additionally or alternatively, egress LER 310 may pop the current transport label from the packet's label stack, thereby exposing VPN label 408 for processing in connection with the packet.

Figure 7:
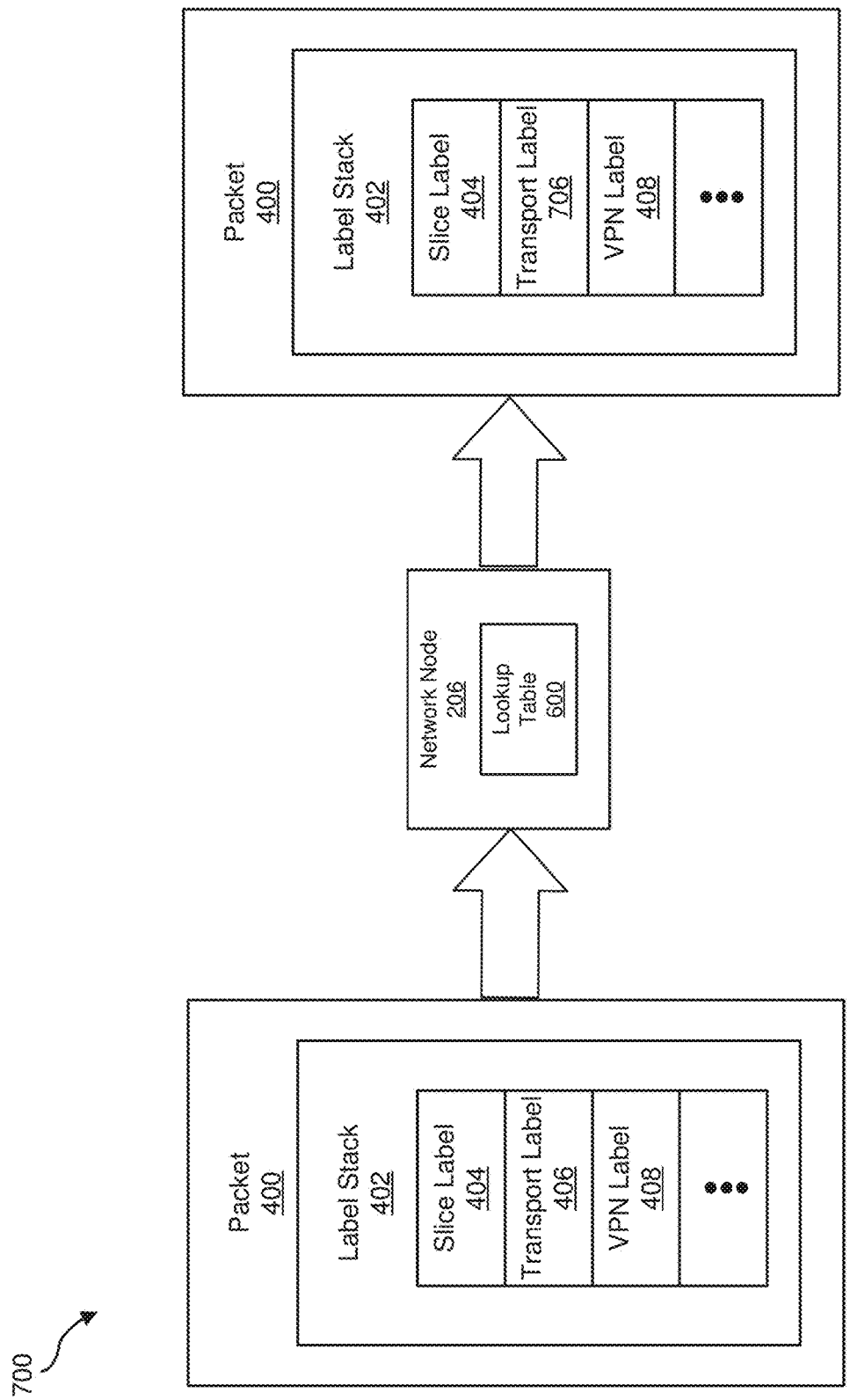
FIG. 7 is a block diagram of an exemplary implementation with a label stack that facilitates steering traffic over network slices.

FIG. 7 illustrates an exemplary implementation 700 in which label stack 402 facilitates steering packet 400 over the assigned network slice. As illustrated in FIG. 7, exemplary implementation 700 may involve packet 400 traversing through network node 206. In one example, network node 206 may receive packet 400 and then pop slice label 404 and transport label 406 from label stack 402 of packet 400. In this example, network node 206 may determine which of QoS policies 134 corresponds to packet 400 based at least in part on slice label 404. Network node 206 may apply that QoS policy to packet 400. Network node 206 may also look up, in lookup table 600, a transport label 706 that indicates the next hop based at least in part on transport label 406. Network node 206 may then impose transport label 706 on label stack 402 and/or reimpose slice label 404 on label stack 402 before forwarding packet 400 to the next hop.

Figure 8:
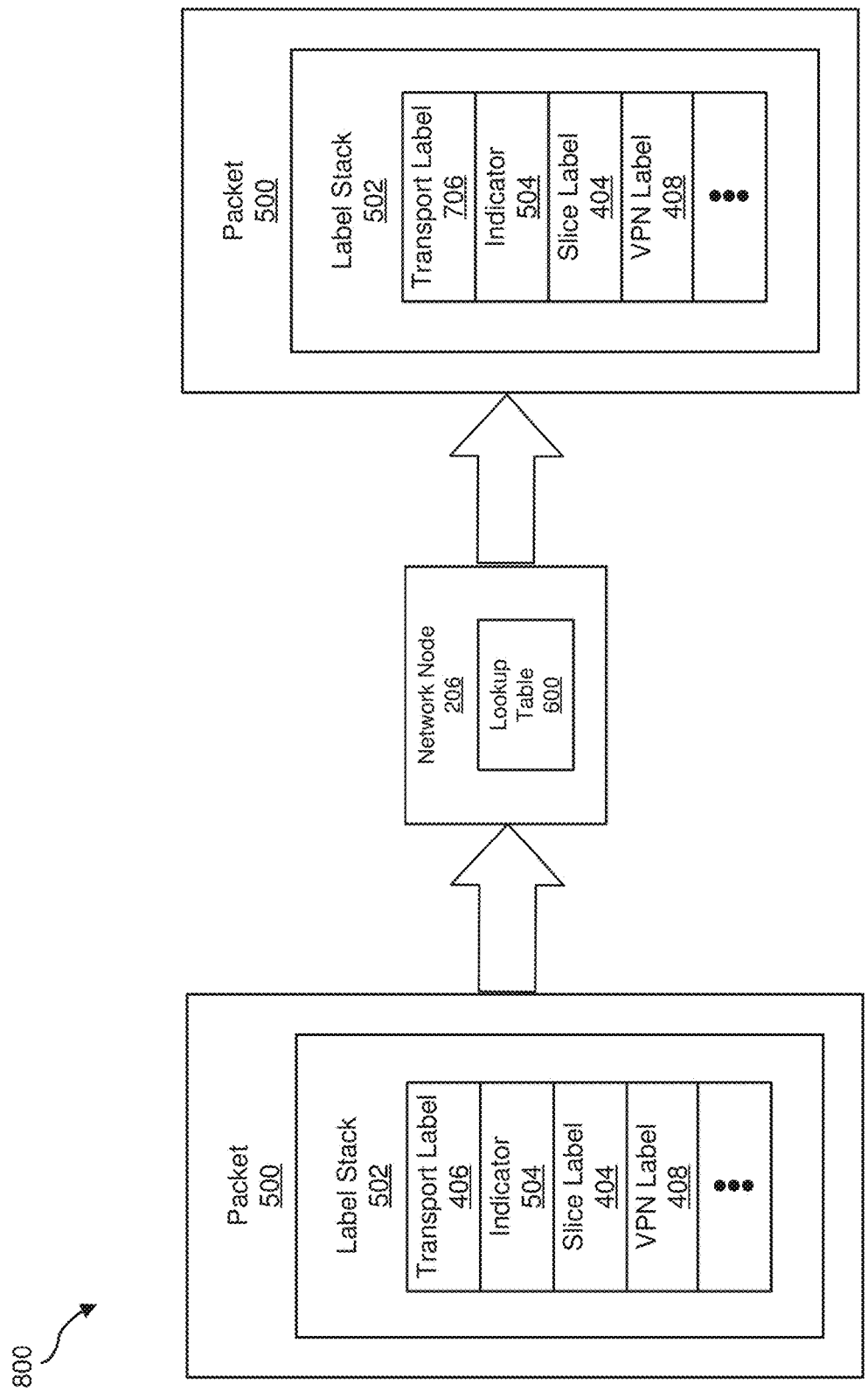
FIG. 8 is a block diagram of an additional exemplary implementation with an additional label stack that facilitates steering traffic over network slices.

FIG. 8 illustrates an exemplary implementation 800 in which label stack 502 facilitates steering packet 500 over the appropriate network slice. As illustrated in FIG. 8, exemplary implementation 800 may involve packet 500 traversing through network node 206. In one example, network node 206 may receive packet 500 and then pop transport label 406, indicator 504, and slice label 404 from label stack 502 of packet 500. In this example, network node 206 may determine which of QoS policies 134 corresponds to packet 500 based at least in part on slice label 404. Network node 206 may apply that QoS policy to packet 500. Network node 206 may also look up, in lookup table 600, transport label 706 that indicates the next hop based at least in part on transport label 406. Network node 206 may then reimpose slice label 404 and indicator 504 on label stack 502 and/or impose transport label 706 on label stack 502 before forwarding packet 500 to the next hop.

Figure 10:
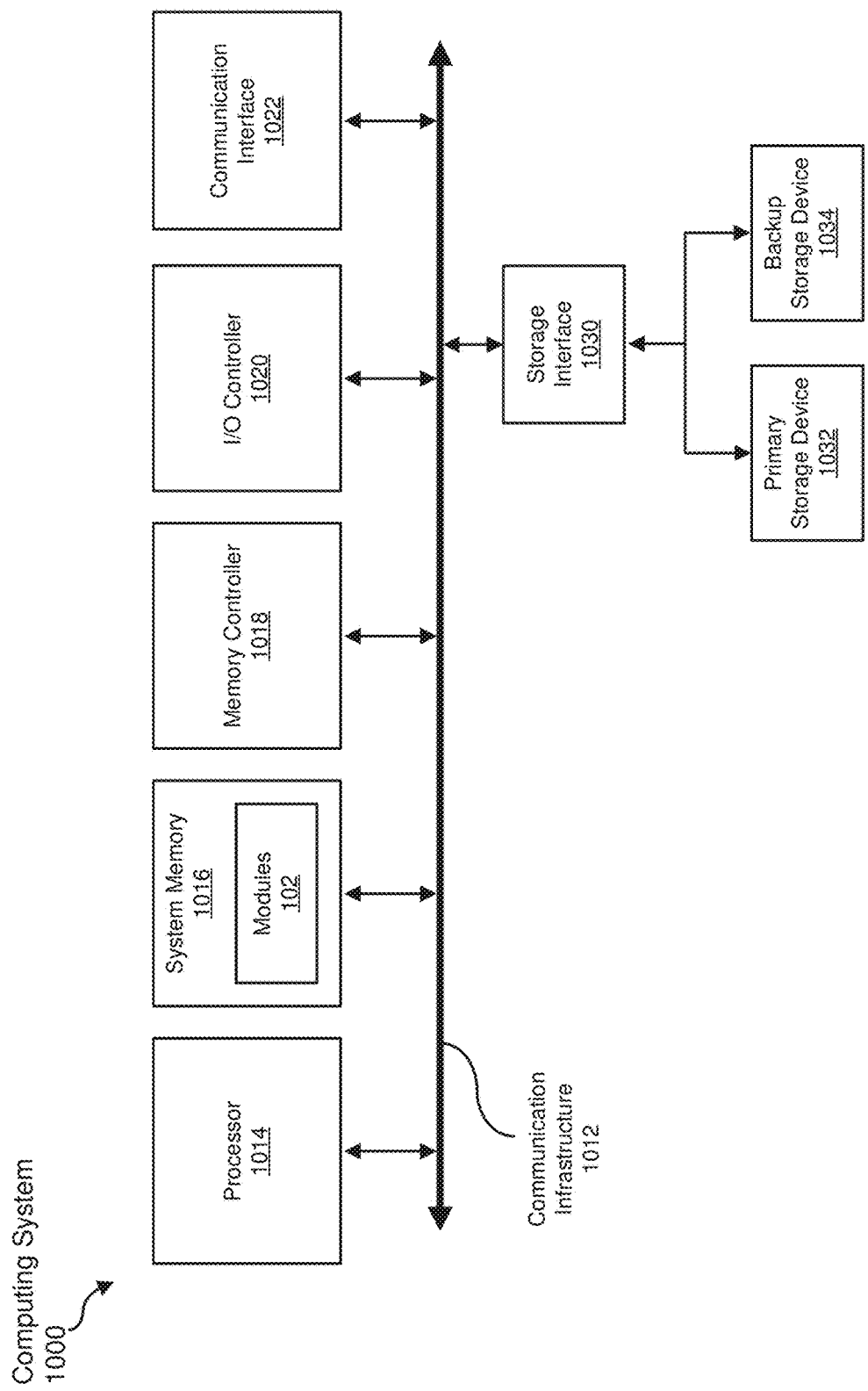
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an application-specific integrated circuit (ASIC), a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (DATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or f the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a network node within a network, a packet from another network node within the network;
   searching a label stack of the packet for an indicator that indicates a presence of a slice label that indicates a network slice that has been logically partitioned on the network in a next position within the label stack;
   during the search for the indicator:
      identifying, on top of the label stack of the packet, a transport label that indicates the network node within the label stack; and
      identifying the indicator beneath the transport label within the label stack;
   popping the transport label and the indicator from the top of the label stack of the packet;
   searching the label stack for the slice label;
   during the search for the slice label, identifying the slice label;
   determining a quality of service policy that corresponds to the network slice by analyzing the slice label;
   reimposing the indicator above the slice label within the label stack;
   imposing, on the top of the label stack of the packet, an additional transport label that indicates the additional network node such that the slice label resides beneath the additional transport label within the label stack;
   applying the quality of service policy to the packet; and
   upon applying the quality of service policy to the packet, forwarding the packet to the additional network node within the network.

2. The method of claim 1, wherein the network slice:
   is dedicated to a specific type of service; and
   provides one or more resources to the packet due at least in part to the packet belonging to the network slice.

3. The method of claim 2, wherein applying the quality of service policy to the packet comprises directing the packet to the resources provided by the network slice.

4. The method of claim 1, further comprising:
   popping the slice label from the label stack of the packet; and
   exposing a virtual private network label within the label stack for processing in connection with the packet.

5. The method of claim 1, further comprising:
   looking up the additional transport label in a lookup table based at least in part on the transport label; and
   maintaining the slice label beneath the additional transport label and the indicator as the packet is forwarded to the additional network node.

6. The method of claim 1, further comprising:
   receiving, at the network node, a control signal that originates from a controller; and
   programming the network node to associate the quality of service policy with the network slice based at least in part on the control signal.

7. The method of claim 1, wherein:
   the network comprises a multiprotocol label switching network; and
   the network node comprises at least one of:
      a transit label switching router; and
      an egress label edge router.

8. The method of claim 1, wherein the another network node comprises an ingress label edge router that:
   determines that the packet belongs to the network slice; and
   steers the packet over the network slice by imposing the slice label and the transport label that indicates the network node on the label stack.

9. The method of claim 1, wherein replacing the transport label with the additional transport label comprises:
   popping the transport label from the label stack of the packet;
   looking up the additional transport label that indicates the additional network node in a lookup table based at least in part on the transport label; and
   imposing the additional transport label on the label stack.

10. A system comprising:
   a receiving module, stored in memory on a network node within a network, that receives a packet from another network node within the network;
   an identification module, stored in memory on the network node, that:
      searches a label stack of the packet for an indicator that indicates a presence of a slice label that indicates a network slice that has been logically partitioned on the network in a next position within the label stack;
      during the search for the indicator:

identifies, on top of the label stack of the packet, a transport label that indicates the network node within the label stack; and
identifies the indicator beneath the transport label within the label stack;
searches the label stack for the slice label;
during the search for the slice label, identifies the slice label;
identifies the transport label on top of the label stack of the packet;
a label module, stored in memory on the network node, that:
pops the transport label and the indicator from the top of the label stack of the packet;
reimposes the indicator above the slice label within the label stack; and
imposes, on the top of the label stack of the packet, an additional transport label that indicates the additional network node such that the slice label resides beneath the additional transport label within the label stack;
a determination module, stored in memory on the network node, that determines a quality of service policy that corresponds to the network slice by analyzing the slice label;
a quality of service module, stored in memory on the network node, that applies the quality of service policy to the packet;
a forwarding module, stored in memory on the network node, forwards the packet to the additional network node within the network after the quality of service policy has been applied to the packet; and
a physical processing device configured to execute the receiving module, the identification module, the determination module, the quality of service module, and the forwarding module.

11. The system of claim 10, wherein the network slice:
is dedicated to a specific type of service; and
provides one or more resources to the packet due at least in part to the packet belonging to the network slice.

12. The system of claim 11, wherein the quality of service module directs the packet to the resources provided by the network slice.

13. An apparatus comprises:
at least one storage device that stores a set of quality of service polices that correspond to a set of network slices that have been logically partitioned on a network; and
at least one physical processor communicatively coupled to the storage device, wherein the physical processor:
receives a packet from another network node within the network;
searches a label stack of the packet for an indicator that indicates a presence of a slice label that indicates a network slice that has been logically partitioned on the network in a next position within the label stack;
during the search for the indicator:
identifies, on top of the label stack of the packet, a transport label that indicates the network node within the label stack; and
identifies the indicator beneath the transport label within the label stack;
pops the transport label and the indicator from the top of the label stack of the packet;
searches the label stack for the slice label;
during the search for the slice label, identifies the slice label;
determines a quality of service policy that corresponds to the network slice by analyzing the slice label;
reimposes the indicator above the slice label within the label stack;
imposes, on the top of the label stack of the packet, an additional transport label that indicates the additional network node such that the slice label resides beneath the additional transport label within the label stack;
applies the quality of service policy to the packet; and
forwards the packet to an additional network node within the network upon applying the quality of service policy to the packet.

* * * * *